Patented Feb. 2, 1954

2,668,170

UNITED STATES PATENT OFFICE 2,668,170

HETEROCYCLIC MERCURY AMINE COMPOUNDS

Frank J. Sowa, Cranford, N. J.

No Drawing. Application September 18, 1950,
Serial No. 185,508

8 Claims. (Cl. 260—270)

This application is a continuation-in-part of co-pending application Serial No. 757,953, filed June 28, 1947, now Patent No. 2,524,547.

In applicant's issued Patent No. 2,423,262 dated July 1, 1947, there are described methods and products wherein aromatic and heterocyclic mercury compounds are reacted with alkanol amines to produce compounds wherein a mercury group and an anion are bonded to the nitrogen of the amines by the latent valences of the atom so that a quaternary ammonium type compound is produced. It is pointed out in said patent that when the amine employed is itself water soluble and also is hydroxylated the resulting reaction products are water soluble.

In the foregoing co-pending application amine addition products are produced by reactions between aromatic mercury compounds and amines which are not hydroxylated and do not contain any hydroxylated substituents.

In accordance with the present invention heterocyclic mercury compounds are reacted with primary amines which are not hydroxylated and which do not contain hydroxylated substituents. It is found that such heterocyclic compounds are of a quaternary type and are generally soluble in both water and organic solvents. The products of the present invention are generally characterized by their bacteriocidal and fungicidal properties rendering them useful as agricultural sprays and for addition to paints, coating compositions, soaps and for pharmaceutical purposes and slime control.

One of the objects of the present invention is to provide a novel heterocyclic mercury containing fungicidal compound of a quaternary type.

Another object of the invention is to provide novel methods for producing new fungicidal compounds.

A particular object of the invention is to provide new fungicidal compounds by reaction between the heterocyclic mercury compound and a primary amine which contains no hydroxylated substituents.

These and other objects and features of the invention will appear from the following description thereof.

The organic mercury compounds employed in the practice of the present invention have the general formula R—Hg—X in which R is a heterocyclic group and X is an anion. These compounds differ markedly from aliphatic and alicyclic compounds and from inorganic mercury compounds in that they are themselves generally less corrosive to the skin and easier to employ and they result in the formation of reaction products which are not so injurious or toxic to plant and animal life. Moreover, many inorganic compounds cannot be used to produce stable or satisfactory reaction products with amines. Furthermore, when it is desired to produce reaction products which are more soluble in water and common solvents the anion of the R—Hg—X compound should be an organic acid radical or a hydroxyl group.

The products produced when employing heterocyclic mercury compounds rather than aryl mercury compounds are characterized by the fact that they are more effective against certain types of organisms and are even less irritating to the skin than the aromatic compounds.

Typical heterocyclic compounds which may be used in the practice of the present invention are pyridyl mercuric acetate, 2-methyl-5-acetoxymercuric-thiophene, 2,5-diacetoxymercuric-thiophene, 2-methyl-5-acetoxymercuric-furan. However, these compounds are only cited as typical of those which may be employed, since I believe the reaction to be generic in that all compounds having the general formula R—Hg—X as defined above appear to be capable of use in my invention.

The amines employed in the practice of the present invention are primary amines which contain no hydroxylated substituents. Typical aliphatic amines which may be used are those containing from 6 to 18 carbon atoms such as normal octyl amine, lauryl amine, myristyl amine, decyl amine, cetyl amine and stearyl amine. It has also been found that branch chain amines such as 2-amino heptane can be used. Among the alicyclic amines which may be employed are cyclohexylamine, ortho amino dicyclohexyl. Aralkyl amines such as benzyl amine and unsaturated alkyl amines such as oleyl amine and octadecenylamine may be used also. However, numerous other amines may be employed since it appears that the reaction is generic in character and may be carried out when using any primary amine.

The reaction by which the new products are produced may be expressed by the following empirical equation

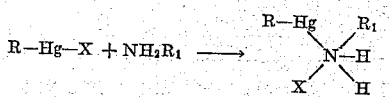

wherein R is a heterocyclic group and X is an anion, and R₁ is a hydrocarbon radical.

Products of such reactions wherein the amine employed is an aliphatic amine containing from 6 to 18 carbon atoms possess the properties of a wetting agent and those containing 8 or more carbon atoms also have detergent properties. A striking characteristic of those reaction products wherein long chain aliphatic amines are used resides in the fact that the addition of the organic mercury group to the amine serves in most instances to result in increased water solubility. Thus for example lauryl amine, which is substantially insoluble in water, may be combined with pyridyl mercuric acetate and similar compounds to produce reaction products which are readily soluble in water. The reaction products of the present invention are generally also soluble in ethanol, hydrocarbons and organic solvents. They are further characteried by their fungicidal action which renders them particularly suitable for use in sprays, for agricultural and other purposes, in textile treatment, and in soaps, paints, lacquers, coating compositions, plastics and cork compositions and for many other purposes wherein the fungicidal and bactericidal properties of the compound are desired or necessary. Their use in pharmaceutical preparations shows considerable promise.

In general the amines used in the practice of the present invention contain at least 6 carbon atoms, since it is found that those products wherein the lower alkyl amines are used are ordinarily much less stable and tend to decompose on standing with the separation of the amine.

The reaction by which the new fungicidal compounds are produced are preferably conducted at ordinary room temperatures and pressures, although the reaction mixture may be heated if desired and in many instances the reaction is exothermic producing a spontaneous rise in temperature as the reaction proceeds. The reaction is usually carried out in the presence of an organic solvent such as ethanol and may be conducted by simply dissolving the reactants in ethanol or by otherwise mixing the organic mercury compound with the amine in the presence of an organic solvent. The temperature of the reaction is preferably maintained below the boiling point of the solvent employed.

In order to indicate the nature of my invention more fully and to illustrate typical procedure and products to which my invention relates, the following examples are cited:

In the following examples the pyridyl mercuric acetate used was a commercial product which according to the manufacturer is assayed at about 75% pyridyl mercuric acetate, the rest being alkali acetates. Accordingly in the examples allowance is made for the impurities using 41 grams pyridyl mercuric acetate, containing 30.7 grams (0.0935 mol.) of the mercurial. In all cases 0.1 mol of amine was used. The long chain amines employed were commercial materials.

*Example 1*

To 41 g. of pyridylmercuric acetate were added 100 cc. of benzene and 18.5 g. of laurylamine. Immediate reaction occurred upon stirring the materials and a major portion of the solid went into solution. After one half hour of stirring the product was filtered. The benzene was evaporated and there was obtained a viscous oil which solidified upon standing overnight. The yield was 44.5 g. The crude product was pale yellow in color and melted at 40–41° C. After a thorough washing with ethyl ether the pure white crystalline material obtained melted at 46–47° C. This product is believed to have the following structural formula:

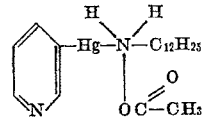

This product may be termed pyridyl mercuri lauryl ammonium acetate.

*Example 2*

To 41 g. of pyridyl mercuric acetate were added 125 cc. of benzene and 21.3 g. myristyl amine. Immediate reaction occurred upon stirring the materials and a major portion of the mercurial went into solution. After standing for three hours the product was filtered and the benzene evaporated yielding a viscous oil which upon standing overnight solidified to a pale orange solid melting at 36–37° C. The yield was 49 g. After thorough washing with ethyl ether the pure white material obtained melted at 47–48° C. This product is believed to have the following structural formula:

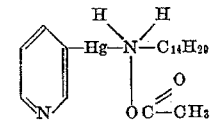

This product may be be termed pyridyl mercuri myristyl ammonium acetate.

*Example 3*

To 41 g. of pyridyl mercuric acetate were added 125 cc. benzene and 24.1 g. of cetyl amine. Immediate reaction occurred upon stirring the materials and the major portion of the mercurial ultimately went into solution. It was filtered after stirring for three hours and the benzene evaporated leaving a pale yellow solid which melted at 48–49° C. The yield was 42 g. After washing with ethyl ether the pure white crystalline compound obtained melted at 53–54° C. This product is believed to have the following structural formula:

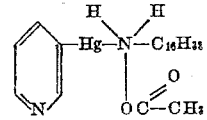

This product may be termed pyridyl mercuri cetyl ammonium acetate.

*Example 4*

To 41 g. of pyridyl mercuric acetate were added 125 cc. of benzene and 26.9 g. of stearyl amine. Immediate reaction occurred upon stirring and the major portion of the mercurial ultimately went into solution. After stirring for three hours the product was filtered and the benzene evaporated leaving a pale yellow solid which melted at 49–50° C. The yield was 42 g. After washing with ethyl ether the pure white crystalline product obtained melted at 52.5–53.5° C. This product is believed to have the following structural formula:

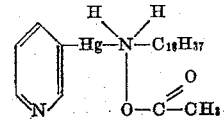

This product may be termed pyridyl mercuri stearyl ammonium acetate.

Example 5

To 41 g. of pyridyl mercuric acetate were added 125 cc. benzene and 12.9 g. of octyl amine. Immediate reaction occurred upon stirring the materials and the major portion of the solid rapidly dissolved. The product was stirred for one and one half hours and the benzene evaporated yielding a viscous oil which was clear and slightly yellowish. The yield was 40 g. This product is believed to have the structural formula as follows:

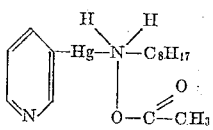

This product may be termed pyridyl mercuri octyl ammonium acetate.

Example 6

To 41 g. of pyridyl mercuric acetate were added 125 cc. of benzene and 10.7 g. of benzyl amine. A rapid reaction occurred and the mixture became slightly warm. After stirring for three hours the product was allowed to settle and separated into two layers. The lower oilier layer was orange in color and weighed 29 g. The product is believed to have the following structural formula:

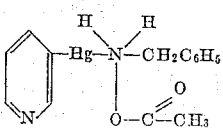

This product may be termed pyridyl mercuri benzyl ammonium acetate.

Example 7

To 41 g. of pyridyl mercuric acetate were added 125 cc. of benzene and 9.9 g. of cyclohexyl amine. A rapid reaction occurred and the mixture became slightly warm. After two and one half hours of stirring the product was allowed to settle and separated into two layers. The lower layer solidified upon standing and the benzene was decanted. The yield was 47 g. However, the product was impure by reason of the presence of alkali acetates which would not separate from the amine complex even when extracted with isopropyl alcohol, acetone, dioxane, ethyl acetate, and cyclohexane. This product is believed to have the following structural formula:

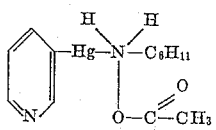

This product may be termed pyridyl mercuri cyclohexyl ammonium acetate.

Example 8

To 35.7 g. of 2-methyl-5-acetoxymercuric-thiophene were added 75 cc. of ethanol. While this mixture was stirred a solution of 18.5 g. of lauryl amine in 25 cc. of ethanol was added. A rapid exothermic reaction occurred and solution of the mercurial was quickly effected. Within a few minutes the solution became cloudy and after stirring for one and one half hours it was filtered. The pale yellow filtrate was evaporated to dryness yielding a yellow oil weighing 48 g. This product is believed to have the following structural formula:

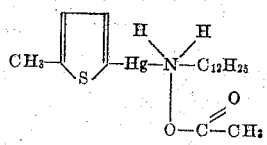

This product may be termed 2 methyl 5 mercuri thienyl lauryl ammonium acetate.

Example 9

To 35.7 g. of 2-methyl-5-acetoxymercuric-thiophene was added 100 cc. of ethanol. While this mixture was stirred a solution of 24.1 g. of cetyl amine and 50 cc. of ethanol were added. A rapid reaction occurred and most of the mercurial went into solution. After 45 minutes of stirring the product was filtered. The filtrate was evaporated yielding 56.5 g. of a pale yellow solid which melted at 40-41° C. This product is believed to have the following structural formula:

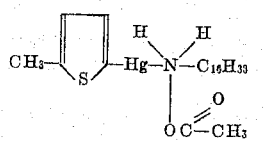

This product may be termed 2 methyl 5 mercuri thienyl cetyl ammonium acetate.

Example 10

To 35.7 g. of 2-methyl-5-acetoxymercuric-thiophene was added 100 cc. of ethanol and while the mixture was stirred a solution of 26.9 g. of stearyl amine and 50 cc. of ethanol were added. A rapid reaction occurred and most of the mercurial went into solution. After stirring for three hours the product was filtered. The ethanol was evaporated from the filtrate leaving a pale yellow solid melting at 48-50° C. This product is believed to have the following structural formula:

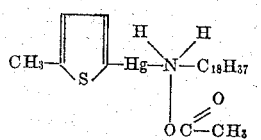

This product may be termed 2 methyl 5 mercuri thienyl stearyl ammonium acetate.

Example 11

To 35.7 g. of 2-methyl-5-acetoxymercuric-thiophene was added 100 cc. of ethanol and while the mixture was being stirred 12.9 g. of octyl amine were added. A rapid exothermic reaction occurred and the solution of the material was quickly effected. After stirring for 1.5 hours the product was filtered and the filtrate evaporated yielding 42.5 g. of a viscous pale yellow oil. This product is believed to have the following structural formula:

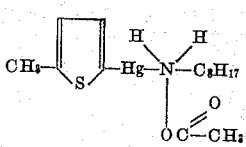

This product may be termed 2 methyl 5 mercuri thienyl octyl ammonium acetate.

Each of the foregoing examples was repeated using isopropyl and butyl amine whereupon an exothermic reaction occurred. Upon evaporation of alcohol reaction products were obtained in each instance. However, in general the products resulting when using aliphatic amines containing less than 6 carbon atoms are less stable and satisfactory than those obtained when using long chain aliphatic amines, and cyclic amines. Furthermore, such lower amine reaction products possess little or no wetting action.

The solubility of the products obtained in the foregoing examples are indicated in the following table:

| Example No. | Benzene | Acetone | Cyclohexane | Stoddard Solvent | Solox (Ethanol) | Ethyl Acetate | Water |
|---|---|---|---|---|---|---|---|
| 1 | v. sol. | v. sl. sol. | sol. | sl. sol. | sol. | sl. sol. | sol. |
| 2 | v. sol. | sol. | sol. | sl. sol. | sol. | sl. sol. | sol. |
| 3 | v. sol. | sol. | sl. sol. | sol. warm. | v. sol. | sl. sol. | sl. sol. |
| 4 | v. sol. | sol. | sol. | sol. warm. | v. sol. | sol. warm. | v. sl. sol. |
| 5 | sol. | v. sl. sol. | insol. | insol. | v. sol. | v. sol. | v. sol. |
| 6 | sol. | sol. | sl. sol. | sl. sol. | v. sol. | v. sol. | v. sol. |
| 7 | sol. | sol. | sol. | sl. sol. | v. sol. | sl. sol. | sl. sol. |
| 8 | sol. | v. sl. sol. | sol. | sl. sol. | v. sol. | sl. sol. | sl. sol. |
| 9 | v. sol. | v. sl. sol. | sol. | sol. | v. sol. | sl. sol. | v. sl. sol. |
| 10 | v. sol. | v. sl. sol. | sol. | sol. | v. sol. | sl. sol. | v. sol. |
| 11 | v. sol. | v. sl. sol. | insol. | insol. | v. sol. | sl. sol. | v. sl. sol. |

NOTE.—v.=very; sol.=soluble; sl.=slightly.

Solutions wherein the reaction products of the present invention are dissolved in water or organic solvents may be employed as fungicidal sprays for agricultural purposes, for the treatment of textile fabrics, and for other uses, and the reaction products may be added to paints, lacquers, varnishes and other coating compositions which embody an organic solvent. They also may be employed as constituents of molded or plastic compositions or filaments or sheets of plastic material.

While I have indicated preferred procedure for use in producing products of my invention and have cited numerous examples of these new fungicidal compounds, it will be apparent that many other methods and compositions may be produced and used in accordance with my invention. Therefore, it should be understood that the methods and examples particularly described above are intended to be illustrative only and are not intended to limit the scope of my invention.

I claim:

1. A fungicidal compound having the composition represented by the formula

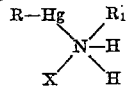

wherein R is a heterocyclic radical selected from the group consisting of pyridyl, thienyl, and furyl radicals, X is an anion, and $R_1$ is a hydrocarbon radical selected from the group consisting of alkyl radicals containing 6 to 18 carbon atoms, and cyclohexyl and benzyl radicals.

2. A pyridyl mercuri-salt of a primary alkyl amine.

3. A pyridyl mercuri-salt of a primary alkyl amine wherein the alkyl group contains from 6 to 18 carbon atoms.

4. Pyridyl mercuri lauryl ammonium acetate.

5. Pyridyl mercuri myristyl ammonium acetate.

6. Pyridyl mercuri cetyl ammonium acetate.

7. Pyridyl mercuri stearyl ammonium acetate.

8. Pyridyl mercuri octyl ammonium acetate.

FRANK J. SOWA.

References Cited in the file of this patent

UNITED STATES PATENTS

| Number | Name | Date |
|---|---|---|
| 2,085,065 | Andersen | June 29, 1937 |
| 2,423,121 | Sowa | July 1, 1947 |
| 2,423,262 | Sowa | July 1, 1947 |
| 2,524,547 | Sowa | Oct. 3, 1950 |